Patented May 13, 1930

1,758,598

UNITED STATES PATENT OFFICE

DE RALPH FRIZELL, OF WATSON, CALIFORNIA, ASSIGNOR, BY MESNE ASSIGNMENTS, TO RICHFIELD OIL COMPANY OF CALIFORNIA, OF LOS ANGELES, CALIFORNIA, A CORPORATION OF DELAWARE

PRODUCT FOR TREATING DRILL-STEM JOINTS

No Drawing.    Application filed June 7, 1927.  Serial No. 197,243.

This invention relates to a new and useful product for treating drill stem joints of oil and water well drilling equipment. Heretofore, difficulty has been experienced in obtaining a lubricant which will adhere to the screw joints of drill stems, in order that the same may be readily connected or disconnected by thread screw joints, when removing or lowering oil or water well drilling equipment from or into wells during the regular procedure of drilling.

During the drilling of wells, especially when rotary drilling equipment is employed, the threaded joints of the equipment are under considerable load and are usually operated under water, slime or mud. Under such conditions it is very essential to provide a lubricant that will adhere to the threaded joints, so as to prevent corrosive oxidation that would cement the threaded connections, and thereby prevent the joints from being easily disconnected or connected when removing or lowering oil or water well drilling equipment during drilling operations.

I have discovered that these difficulties can be overcome and a satisfactory lubricant made by the employment of a comminuted metal, such as air floated zinc dust, lead, aluminum, tin and the like, commingled with a calcium soap grease of any of the well-known types, such for example as cup greases. Preferably, a grease having a composition of approximately 14 per cent by weight calcium stearate, oleate, palmitate, or mixtures of the same, made by the saponification and formation of calcium soaps from tallow, beef fat, vegetable or animal oils and the like, combined with approximately 86 per cent by weight of the mineral oil lubricant. The mineral oil lubricant is preferably one having a viscosity ranging from 110 to 200 seconds at 100° F., Saybolt, although other lubricating oils may be employed having a higher or lower viscosity.

The calcium soap grease provides a water insoluble corrosive proof adhesive menstrum which will not be washed off by the action of the water in the rotary mud or slime, and the zinc dust acts as minute ball bearings providing rolling surfaces, thereby preventing the protective grease coating from being squeezed out from the screw joint threads when under working load and pressure conditions.

As one example of a suitable lubricant, the following composition is given:

40 per cent by weight air floated zinc dust.
60 per cent by weight cup grease.

The composition of the cup grease is preferably approximately 14 per cent by weight calcium soap and 86 per cent by weight mineral lubricating oil, having a viscosity of approximately 110 to 200 seconds at 100° F. Saybolt. The cup grease may be made by any preferred method known in the art, and commingled with the required percentage of zinc dust which may also be varied over a considerable range and like results obtained, depending upon the products employed and the products desired. In certain cases as low as 10 per cent by weight zinc dust may be employed while in other cases as high as 60 per cent by weight zinc dust may be found advantageous. Also it is to be understood that the percentage of calcium soap used in the manufacture of the cup grease may be varied to suit conditions.

While the product herein described is well adapted for carrying out the objects of the present invention, it is to be understood that various modifications and changes may be made without departing from the spirit of the invention and the invention includes all changes and modifications as appear in the scope of the appended claims.

I claim:
1. A new product comprising a water insoluble grease composed of a calcium soap and a mineral lubricating oil containing suspended comminuted spherical particles of a metal,

2. A new product comprising a water insoluble grease composed of a calcium soap and a mineral lubricating oil containing suspended spherical metallic particles.

3. A new product comprising a water insoluble grease composed of a calcium soap and a mineral lubricating oil containing suspended spherical metallic particles, said particles providing rolling surfaces whereby expression of the grease is prevented.

In testimony whereof I affix my signature.

DE RALPH FRIZELL.